United States Patent
Hosoya et al.

(10) Patent No.: US 8,765,838 B2
(45) Date of Patent: Jul. 1, 2014

(54) NON-AQUEOUS INK COMPOSITION FOR INKJET PRINTING

(75) Inventors: Tetsuo Hosoya, Ibaraki-ken (JP); Toshihiro Endo, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 304 days.

(21) Appl. No.: 13/246,098

(22) Filed: Sep. 27, 2011

(65) Prior Publication Data

US 2012/0083567 A1 Apr. 5, 2012

(30) Foreign Application Priority Data

Sep. 30, 2010 (JP) .............................. P2010-220637
Jun. 22, 2011 (JP) .............................. P2011-138490

(51) Int. Cl.

| B01J 19/06 | (2006.01) |
|---|---|
| B41J 2/01 | (2006.01) |
| B41J 2/17 | (2006.01) |
| B41J 2/175 | (2006.01) |
| C08F 8/30 | (2006.01) |
| C08F 222/40 | (2006.01) |
| C08F 283/04 | (2006.01) |
| C08F 290/04 | (2006.01) |
| C08G 18/08 | (2006.01) |
| C08G 18/42 | (2006.01) |
| C08G 69/26 | (2006.01) |
| C08G 69/44 | (2006.01) |
| C08L 37/00 | (2006.01) |
| C08L 39/00 | (2006.01) |
| C08L 51/00 | (2006.01) |
| C08L 75/00 | (2006.01) |
| C08L 77/00 | (2006.01) |
| C08L 79/00 | (2006.01) |
| C09B 67/00 | (2006.01) |
| C09D 5/00 | (2006.01) |
| C09D 5/02 | (2006.01) |
| C09D 11/00 | (2014.01) |
| G01D 11/00 | (2006.01) |

(52) U.S. Cl.
USPC .................. 523/160; 347/1; 347/85; 347/95; 347/100; 523/161; 524/507; 524/538; 524/539; 524/502; 524/504; 524/516; 524/521; 524/548; 524/555; 524/602; 525/123; 525/455

(58) Field of Classification Search
USPC .......... 523/160, 161; 524/507, 538, 539, 502, 524/504, 516, 521, 548, 555, 602; 525/123, 525/455; 347/1, 85, 95, 100
See application file for complete search history.

(56) References Cited

U.S. PATENT DOCUMENTS

| 7,635,504 | B2 * | 12/2009 | Elwakil et al. ................. 427/466 |
|---|---|---|---|
| 8,038,784 | B2 | 10/2011 | Watanabe et al. |
| 8,137,449 | B2 | 3/2012 | Endo |
| 2007/0173560 | A1 | 7/2007 | Uozumi |
| 2010/0136236 | A1 | 6/2010 | Hosoya et al. |
| 2011/0045257 | A1 * | 2/2011 | Arai et al. ..................... 428/207 |
| 2011/0046298 | A1 | 2/2011 | Hosoya et al. |

FOREIGN PATENT DOCUMENTS

| CN | 101275044 A | 10/2008 |
|---|---|---|
| CN | 101575468 A | 11/2009 |
| JP | 2005-171032 A | 6/2005 |
| JP | 2007-197500 A | 8/2007 |
| JP | 2007-326930 A | 12/2007 |
| JP | 2010-001452 A | 1/2010 |

OTHER PUBLICATIONS

Machine English translation of JP 2010-001452, Nakamura et al., Jan. 2010.*
Official Action, State Intellectual Property Office, Application No. 2011103041866, dated Aug. 14, 2013, eight (8) pages, with English Abstract.

* cited by examiner

*Primary Examiner* — Patrick Niland
(74) *Attorney, Agent, or Firm* — Nath, Goldberg & Meyer; Jerald L. Meyer; Lakshmi Rajan

(57) ABSTRACT

A non-aqueous ink composition for inkjet printing, comprising 5 to 15% by mass of pigment relative to a mass of the non-aqueous ink composition, a pigment dispersant in such an amount that a mass ratio of the pigment dispersant to the pigment ranges from 0.2 to 2.0, and an organic solvent, the pigment dispersant comprising
(A) a polyamide having a polyester side chain and/or a copolymer of vinylpyrrolidone and a $C_{10-40}$ alkene, and
(B) an alkyl(alkyl)acrylate copolymer having a $C_{12-25}$ alkyl group and a nitrogen-containing group
in such an amount that a mass ratio of the dispersant (B) to a total of the dispersant (A) and the dispersant (B), (B)/[(A)+(B)], ranges from 0.75 to 0.99. The ink composition has good storage stability and causes no satellite even printed in an environment of a low temperature.

5 Claims, No Drawings

NON-AQUEOUS INK COMPOSITION FOR INKJET PRINTING

CROSS REFERENCE TO RELATED APPLICATIONS

This Application is based upon and claims the benefit of priority from Japanese Patent Applications No. 2010-220637 filed on Sep. 30, 2010, and Japanese Patent Applications No. 2011-138490 filed on Jun. 22, 2011, the entire contents of which are incorporated by reference herein.

FIELD OF THE INVENTION

The present invention relates to a non-aqueous ink composition for inkjet printing, specifically to a non-aqueous ink composition containing a specific combination of dispersants to show little satellites.

BACKGROUND OF THE INVENTION

In an inkjet printer, ink droplets held in an ink reservoir are ejected from a nozzle by pressing the ink reservoir provided in an inkjet head. The droplet ejected from the nozzle flies while tailing with the head and the tail thereof each having different flying velocity and time. This tailing sometimes causes formation of undesirable small droplets called satellites associated with the preceding main droplet. A non-aqueous ink in particular tends to form such satellites due to a low dynamic surface tension thereof. Further, a high-speed printer is prone to form satellites due to its high drive frequency, sometimes causing significant blots in printed images.

As a method to prevent such satellites from occurring, Japanese Patent Application Laid-Open No. 2007-326930 discloses a non-aqueous inkjet ink containing a polyvinylchloride resin having sulfonic acid groups or sulfuric acid groups. As a reason for the ink's preventing satellites, it is speculated that the sulfonic or sulfuric acid groups adsorb on dispersed pigments to prevent their agglomeration by increasing steric hindrance of the pigments, and thus improve storage stability as well as preventing satellite from occurring even when the ink is ejected continuously.

Meanwhile, the incorporation of a resin dispersed in a solvent is practiced to prevent pigments from agglomerate. As the resin, Japanese Patent Application Laid-Open No. 2005-171032 discloses resin particles comprising a core of $C_{1-4}$ alkylester of poly(meth)acrylic acid and a shell of $C_{4-10}$ alkyl ester of poly(meth)acrylic acid, Japanese Patent Application Laid-Open No. 2007-197500 discloses particles of copolymer, which also function as pigment dispersants, of $C_{12-25}$ alkyl ester of poly(meth)acrylic acid and acrylic monomer having a specific functional group such as glycidyl group, and Japanese Patent Application Laid-Open No. 2010-1452 discloses a copolymer resin, which is improved in pigment dispersion capability by incorporating a urethane moiety in $C_{12-25}$ alkyl ester of poly(meth)acrylic acid.

SUMMARY OF THE INVENTION

Problems to be Solved by the Invention

Inks comprising the aforesaid dispersant resins, however, are not free from satellites satisfactorily, particularly in an environment of a low temperature. Further, there is room for improving storage stability. Thus, an object of the present invention is to provide a non-aqueous ink composition that is not only excellent in storage stability but also capable of forming printed images without satellites even at a low temperature.

Means to Solve the Problems

Thus, the present invention is a non-aqueous ink composition for inkjet printing, comprising 5 to 15% by mass of pigment relative to a mass of the non-aqueous ink composition, a pigment dispersant in such an amount that a mass ratio of the pigment dispersant to the pigment ranges from 0.2 to 2.0, and an organic solvent, the pigment dispersant comprising (A) a polyamide having a polyester side chain and/or a copolymer of vinylpyrrolidone and a $C_{10-40}$ alkene, and (B) an alkyl(alkyl)acrylate copolymer having a $C_{12-25}$ alkyl group and a nitrogen-containing group in such an amount that a mass ratio of the dispersant (B) to a total of the dispersant (A) and the dispersant (B), (B)/[(A)+(B)], ranges from 0.75 to 0.99.

Effects of the Invention

The above non-aqueous ink composition of the present invention, which hereinafter may be referred to as "ink composition", forms no satellites even at a low temperature and achieves good storage stability by containing the specific dispersants (A) and (B) in the specific ratio which suppress viscosity change due to temperature change, and keep good dispersion of the pigment.

DETAILED DESCRIPTION OF THE PREFERRED EMBODIMENTS

<Dispersant (A)>

Dispersant (A) is a polyamide having a polyester side chain and/or a copolymer of vinylpyrrolidone and a $C_{10-40}$ alkene. Examples of the polyamide having a polyester side chain include a dispersant having a main chain comprising a nitrogen atom such as polyethyleneimine and a plurality of side chains having a polyester moiety bonded via an amide bond to the main chain comprising the nitrogen atom. An illustrative example is a comb-shaped dispersant described in Japanese Patent Laid-Open No.H5-177123, or U.S. Pat. No. 4,645,611, having a polyalkyleneamine main chain and a side chain that is bonded to a nitrogen atom of the main chain and has 3 to 80 repeating units of the following formula:

$$—[C(=O)—R^1O]— \qquad (1)$$

wherein $R^1$ is a $C_{3-6}$ alkylene group. The polyamide dispersants having the aforesaid structure are commercially available under the trade names of Solsperse 11200, and Solsperse 28000 from Lubrizol Japan Ltd.

In the copolymer of vinylpyrrolidone (VP) and a $C_{10-40}$ alkene, which hereinafter may be referred to as "alkylated PVP", $C_{10-40}$ alkene may be decene, undecene, dodecene, tridecene, tetradecene, pentadecene, hexadecene, heptadecene, octadecene, nonadecene, icosene, eicosene, docosene, triacontene or the like. Of these, copolymers formed from a $C_{12-24}$ alkene are preferred from the viewpoint of dispersion stability, and the use of a VP-hexadecene copolymer, VP-eicosene copolymer or VP-triacontene copolymer or the like is particularly desirable. The copolymer may include a plurality species of alkenes. As for the copolymerization ratio (molar ratio) of the VP and the alkene is preferably such that VP: alkene ranges from 1:9 to less than 5:5, and is more preferably ranges from 2:8 to 4:6, in order to control the polarity of the copolymer. The molecular weight (the weight average molecular weight measured by GPC using polystyrene standards) of the alkylated PVP is preferably within a range from 3,000 to 50,000, and more preferably from 5,000 to 30,000. Examples of commercially available alkylated PVP copolymers include VP-hexadecene copolymers marketed under the product names, Antaron V-216 and Ganex V-216 (both ex ISP Corporation) and Unimer U-151 (ex Induchem AG), and VP-eicosene copolymers marketed under the product names Antaron V-220 and Ganex V-220 (both ex ISP Corporation) and Unimer U-15 (ex Induchem AG). The ink composition may comprise a plurality of different alkylated-PVP copolymers.

<Dispersant (B)>

Dispersant (B) is an alkyl(alkyl)acrylate copolymer having a $C_{12-25}$ alkyl group and a nitrogen-containing group. With the $C_{12-25}$ alkyl group having affinity for an organic solvent in the ink composition and the nitrogen-containing group having affinity for pigments, dispersant (B) functions as a pigment dispersant in dispersed state in the organic solvent. In this text, the term "alkyl(alkyl)acrylate" encompasses alkyl esters of acrylic acid and alkyl esters of (alkyl)acrylic acid such as methacrylic acid.

Examples of the $C_{12-25}$ alkyl group include dodecyl group, tridecyl group, tetradecyl group, pentadecyl group, hexadecyl group, heptadecyl group, octadecyl group, nonadecyl group, icosyl group, henicosyl group, docosyl group, iododecyl group, and isooctadecyl group, which may be branched. A mixture of two or more of these groups may be contained in the copolymer.

Examples of the nitrogen-containing group include amino group, alkylamino group, amide group, urethane group (or aminocarbonyloxy group), ureide group, carbamoyl group, ammonium group, imide group, N-morpholinyl group, N-piperidyl group, and nitrile group.

The first example of preferred dispersant (B) is an alkyl (alkyl)acrylate copolymer having a backbone comprising repeating units of the formula (2), and an urethane side chain or crosslinking comprising repeating units of the formula (3), which copolymer hereinafter may be referred to as "urethane-containing (alkyl)acrylate copolymer."

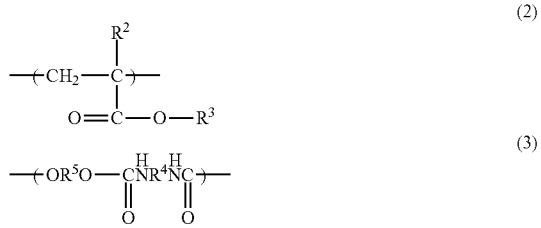

In the above formulas, $R^2$ is a hydrogen atom or a $C_{1-3}$ alkyl group, preferably methyl group, $R^3$ is a $C_{12-25}$ alkyl group, $R^4$ is a $C_{6-16}$ divalent hydrocarbon group, and $R^5$ is a $C_{2-20}$ alkylene group or oxyalkylene group.

The urethane-containing (alkyl)acrylate copolymer can be prepared by the following method. In the first step, the polyalkyl(alkyl)acrylate backbone of the formula (2) is prepared by radically polymerizing (alkyl)acrylate monomer having a $C_{12-25}$ alkyl group.

In the first step, an (alkyl)acrylate monomer having a glycidyl group is used as one of the co-monomers, which is subjected to the radical polymerization, and the resulting glycidyl group bonded to the backbone is then used for preparing a connecting moiety between the backbone and the urethane moiety of the formula (3). Examples of (alkyl)acrylate monomer having a glycidyl group include glycidyl(alkyl) acrylate, glycidyl ether of hydroxyalkyl(alkyl)acrylate such as 4-hydroxybutyl acrylate glycidyl ether, and 3,4-epoxycyclohexylmethyl(meth)acrylate, among which glycidyl (meth) acrylate is preferred. The (alkyl)acrylate monomer having a glycidyl group is contained preferably in an amount of 1 to 30% by mass, more preferably 3 to 25% by mass, and most preferably 10 to 20% by mass of a total mass of the monomers.

The use of a (alkyl)acrylate monomer having a β-diketone group, i.e., —C(=O)—C—C(=O)—), or β-keto ester group, i.e., —C(=O)—C—C(=O)OR, wherein R is a hydrocarbon group, as an additional co-monomer enables one to prepare an ink composition having a lower viscosity. By the use, in selecting a solvent for the ink, there will be fewer restrictions due to the viscosity of the solvent itself, thereby expanding the range of non-aqueous solvents that may be selected. Further, in those cases where fixing resins or additives are added to the ink composition as needed, the permissible increase in the ink composition viscosity caused by adding such components is expanded, resulting in a greater degree of freedom in determining the ink formulation. Moreover, β-diketone group or β-keto ester group suppresses agglomeration of pigments to suppress show-through of printed image and to increase printed image density.

Examples of the (alkyl)acrylate monomer having a β-diketone group or β-keto ester group include acetoacetoxyalkyl (alkyl)acrylates such as acetoacetoxyethyl (alkyl)acrylate, hexadine (alkyl)acrylate, and acetoacetoxyalkyl(alkyl)acrylamides such as acetoacetoxyethyl(alkyl)acrylamide. These monomers may be used individually, or in combinations of two or more monomers.

The amount of the (alkyl)acrylate monomer having β-diketone group or β-keto ester group in the monomer mixture is preferably in the range from 3 to 30% by mass, and more preferably from 5 to 20% by mass.

Examples of other co-monomer include styrene-based monomers such as styrene and α-methylstyrene; vinyl acetate, vinyl benzoate; vinyl ether-based polymers such as butyl vinyl ether; maleic acid esters, fumaric acid esters, acrylonitrile, methacrylonitrile and α-olefins. Further, alkyl (alkyl)acrylates in which the ester-forming alkyl group has less than 12 carbon atoms may also be used, including 2-ethylhexyl(meth)acrylate, isooctyl(meth)acrylate and tert-octyl (meth)acrylate. These monomers may be used individually, or in combinations of two or more monomers.

The radical polymerization in the first step is preferably conducted in an organic solvent. In order to control molecular weight, the use of a chain transfer agent during polymerization is effective. Examples of the chain transfer agent include thiols such as n-butyl mercaptan, lauryl mercaptan, stearyl mercaptan and cyclohexyl mercaptan.

Examples of polymerization initiators that may be used include conventional thermal polymerization initiators, for example, azo compounds such as AIBN (azobisisobutyronitrile), and peroxides such as t-butyl peroxybenzoate and t-butylperoxy-2-ethylhexanoate (Perbutyl O, ex NOF Corporation). Alternatively, a photopolymerization initiator may be used, which generate radicals when irradiated with an active energy beam. As a polymerization solvent, petroleum-based solvents (such as aroma-free (AF) solvents) and the like can be used in a solution polymerization. This polymerization solvent is preferably one or more solvents selected from among those solvents that can be used also as the organic solvent in the ink composition, which will be listed later in the specification. During the polymerization reaction, other typically employed polymerization inhibitors, polymerization accelerators and dispersants and the like may also be added to the reaction system.

In the second step, the glycidyl group-containing polyalkyl (alkyl)acrylate backbone prepared in the first step is reacted with a compound having an alcoholic hydroxyl group and a group capable of reacting with glycidyl group to form a moiety connecting the urethane moiety of the formula (3) to the alkyl(alkyl)acrylate backbone. Examples of the compound having an alcoholic hydroxyl group and a group capable of reacting with glycidyl group include alcohols having an amino group or a carboxyl group, among which aminoalcohols are preferably used. Examples of the aminoalcohol include $C_{2-10}$ monoamine such as monomethylethanolamine, $C_{4-20}$ diolamine such as diethanolamine, and diisopropanolamine, and a mixture thereof. Among these aminoalcohols, $C_{4-20}$ dialkanolamines particularly diethanolamine is preferred. The aminoalcohol is subjected to the reaction preferably in an amount of 0.05 to 1 mole equivalent, more preferably 0.1 to 1 mole equivalent, per mole equivalent of the aforesaid glycidyl group.

The second step can be conducted by adding the aminoalcohol, and polyhydric alcohol as desired, to the copolymer solution obtained in the first step, and then heating, while stirring under a stream of nitrogen gas.

In the third step, a polyisocyanate compound is reacted with the polyalkyl (alkyl)acrylate backbone having alcoholic hydroxyl group prepared in the second step. In this step, the connecting moiety of the following formula (7) is formed when $C_{4-20}$ dialkanolamine has been used in the second step.

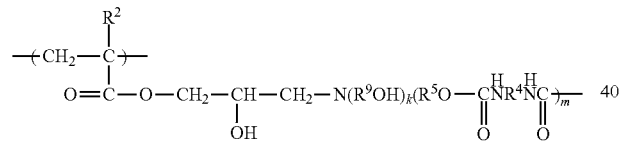

(7)

In the formula, $R^2$, $R^4$ and $R^5$ are as defined above, $R^9$ is a $C_{2-10}$ alkyl group, k=0 and m=2 or k=m=1. Remaining isocyanate groups are to be reacted with polyhydric alcohol to form the urethane moiety. The polyhydric alcohol may be added in the second step. It is considered that the polyhydric alcohol hardly reacts with the glycidyl group, but it causes no problem even if it reacts. Examples of the polyhydric alcohol include polyhydric alcohol having a $C_{2-20}$ alkylene or oxyalkylene group such as ethylene glycol, propylene glycol, dipropylene glycol, 1,3-propanediol, polyethylene glycol, polypropylene glycol and a mixture of these alcohols. The polyhydric alcohol is used preferably in an amount of 10 moles or less, more preferably 1 to 5 moles per mole of the glycidyl-reactive group in the compound having glycidyl-reactive group and alcoholic hydroxyl group.

Examples of the polyisocyanate compound used in the third step include polyisocyanate compound having a $C_{6-16}$ aliphatic group such as an alkylene group, an alicyclic group such as cycloalkylene group, or an aromatic group such as arylene group, for example, 1,6-diisocyanatohexane, 1,3-bis (isocyanatomethyl)benzene, 1,3-bis(isocyanatomethyl)cyclohexane, 1,5-naphthalene diisocyanate, and a mixture of these compounds. In order to ensure that no unreacted alcoholic hydroxyl group remain, the isocyanate compound is preferably reacted in an amount that is substantially equimolar, that is, 0.98 to 1.02 molar equivalents, with the amount of alcoholic hydroxyl group.

The reaction in third step can be performed by adding the polyisocyanate compound to the copolymer solution obtained in the second step, and then heating the mixture in the presence of a catalyst such as a tin catalyst in accordance with a commonly used method.

The urethane moiety is contained in the urethane-containing (alkyl)acrylate copolymer in an amount of from 1 to 40% by mass, preferably from 1 to 30% by mass, and more preferably from 5 to 20% by mass. The mass of the urethane moiety corresponds to a total mass of the aminoalcohol, the polyhydric alcohol, and the isocyanate compound used in the reaction.

The urethane-containing (alkyl)acrylate copolymer has a weight average molecular weight determined by GPC of from 5,000 to 50,000, preferably from 8,000 to 30,000. The use of a copolymer having a lower molecular weight than the aforesaid lower limit tends to degrade storage stability of an ink composition, while the use of a copolymer having a higher molecular weight than the aforesaid higher limit tends to increase a viscosity of an ink composition, degrading discharge stability of an ink composition.

The second example of the preferred dispersant (B) is an alkyl(alkyl)acrylate copolymer having the aforesaid repeating units of the formula (2) and the repeating units of the following formula (4), which alkyl(alkyl)acrylate copolymer hereinafter may be referred to as morpholinyl group-containing (alkyl)acrylate copolymer.

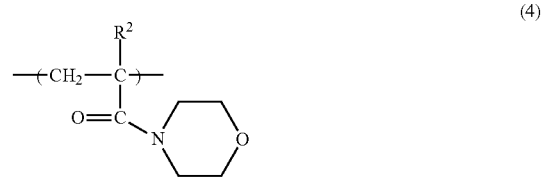

(4)

In the above formula, $R^2$ is a hydrogen atom or a $C_{1-3}$ alkyl group, preferably methyl group.

The morpholinyl group-containing (alkyl)acrylate copolymer may have the repeating units of the following formula (5) in addition to the repeating units of the formulas (2) and (4).

(5)

In the above formula, $R^2$ is a hydrogen atom.

The morpholinyl group-containing (alkyl)acrylate copolymer can be prepared by polymerizing acryloylmorpholine, and acrylic acid as desired, with the polyalkyl (alkyl)acrylate main chain obtained in the similar manner as in the first step of preparing the urethane-containing (alkyl)acrylate copolymer. In the polymerization reaction, other (alkyl)acrylate comonomers such as methyl methacrylate and butyl methacrylate may be added. The ratio of each repeating unit relative to a total number of the repeating units ranges preferably from 45 to 95 mole % for the repeating unit (2), from 1 to 10 mole % for the repeating unit (4), and from 3 to 30 mole % for the repeating unit (5). The morpholinyl-containing (alkyl)acrylate copolymer thus obtained has a weight average molecular weight determined by GPC of from 5,000 to 50,000, preferably from 8,000 to 30,000 for the same reason as sated for the urethane-containing (alkyl)acrylate copolymer.

The third example of the preferred dispersant (B) is an alkyl(alkyl)acrylate copolymer having the repeating units of the aforesaid formula (2) and the repeating units of the following formula (6), which polymer hereinafter may be referred to as "amino-containing (alkyl)acrylate copolymer."

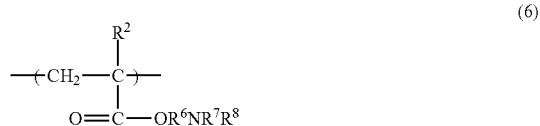

(6)

In the above formula (6), $R^2$ is a hydrogen atom or a $C_{1-3}$ alkyl group, preferably methyl group, $R^6$ is an alkylene group having 1 to 6, preferably 2 to 4, carbon atoms, and $R^7$ and $R^8$ are independently alkyl groups having 1 to 6, preferably 1 to 3, carbon atoms.

The amino-containing (alkyl)acrylate copolymer may contain, in addition to the aforesaid repeating units of the formulas (2) and (6), the repeating units of the aforesaid formula (5) and/or repeating units derived from a polystyrene macromer or polystyrene/acrylonitrile macromer each having a terminal methacryloyl group. Examples of such macromers include AS-6 and AN-6S both having a molecular weight of about 6,000, available from Towagosei Co., Ltd.

The amino-containing (alkyl)acrylate copolymer can be prepared by polymerizing (alkyl)acrylic monomers constituting each of the aforesaid repeating units as in the polymerization reaction in the first step of preparing the aforesaid urethane-containing (alkyl)acrylate copolymer. The ratio of each repeating unit to total repeating units preferably ranges from 45 to 95 mole % for the repeating unit of the formula (2), from 3 to 40 mole % for the repeating unit of the formula (6), and 0 to 2 mole % for the repeating unit derived from the polystyrene macromer. The amino-containing (alkyl)acrylate copolymer has a weight average molecular weight determined by GCP of from 5,000 to 50,000, preferably from 8,000 to 30,000 for the same reason as stated for the urethane-containing (alkyl)acrylate copolymer.

Dispersant (A) and dispersant (B) are contained in the ink composition in such an amount that a ratio of their total mass to the pigment mass ranges from 0.2 to 2.0, preferably from 0.2 to 1.5, more preferably from 0.2 to 1.0. If the ratio is below the aforesaid lower limit, a sufficient dispersing effect would not be achieved. On the other hand, an ink composition with the ratio being higher than the aforesaid upper limit would have a higher viscosity, showing poorer discharge stability. A mass ratio of the dispersant (B) to a total of dispersants (A) and (B), i.e., (B)/[(A)+(B)], ranges from 0.75 to 0.99, preferably from 0.8 to 0.95. If the ratio exceeds the aforesaid higher limit, storage stability would be worse. On the other hand, satellites would not be sufficiently prevented if the ratio is below the aforesaid lower limit. It should be noted that the dispersant (A) and dispersant (B) can be incorporated in the ink composition in the form of a solution or dispersion in a solvent. In that case, the aforesaid mass mans a solid content of the dispersants.

<Pigment>

In the present ink composition, pigment is not limited to a particular one. Examples of black pigment include carbon blacks such as furnace black, lamp black, acetylene black and channel black; metals or metal oxides such as copper, iron and titanium oxide; and organic pigments such as orthonitroaniline black. These pigments may be used either individually, or in combinations of two or more different pigments. Preferred pigment in terms of high printed image density is carbon black pigment having a dibutyl phthalate (DBP) oil absorption number, measured according to Japanese Industrial Standards (JIS) K6221, of from 80 $cm^3$/100 to 140 $cm^3$/100 g and a BET specific surface area, measured by using nitrogen gas according to JIS K6217, of from 100 $m^2$/g to 200 $m^2$/g.

Examples of pigments that may be used for color inks include toluidine red, permanent carmine FB, disazo orange PMP, lake red C, brilliant carmine 6B, quinacridone red, dioxane violet, orthonitroaniline orange, dinitroaniline orange, vulcan orange, chlorinated para red, brilliant fast scarlet, naphthol red 23, pyrazolone red, barium red 2B, calcium red 2B, strontium red 2B, manganese red 2B, barium lithol red, pigment scarlet 3B lake, lake bordeaux 10B, anthocyn 3B lake, anthocyn 5B lake, rhodamine 6G lake, eosine lake, iron oxide red, naphthol red FGR, rhodamine B lake, methyl violet lake, dioxazine violet, naphthol carmine FB, naphthol red M, fast yellow AAA, fast yellow 10G, disazo yellow AAMX, disazo yellow AAOT, disazo yellow AAOA, disazo yellow HR, isoindoline yellow, fast yellow G, disazo yellow AAA, phthalocyanine blue, Victoria pure blue, basic blue 5B lake, basic blue 6G lake, fast sky blue, alkali blue R toner, peacock blue lake, Prussian blue, ultramarine, reflex blue 2G, reflex blue R, alkali blue G toner, brilliant green lake, diamond green thioflavine lake, phthalocyanine green G, green gold, phthalocyanine green Y, iron oxide powder, rust powder, zinc white, titanium oxide, calcium carbonate, clay, barium sulfate, alumina white, aluminum powder, bronze powder, daylight fluorescent pigments, and pearl pigments. These pigments may be used either individually, or in arbitrary mixtures.

From the viewpoints of discharge stability and storage stability, the average particle size of the pigment is preferably not more than 300 nm, more preferably not more than 150 nm, and most preferably 100 nm or less. Here, the average particle size of the pigment may be measured using a dynamic light-scattering particle size distribution measurement apparatus, for example, LB-500 manufactured by Horiba, Ltd.

The pigment preferably contained in the ink composition in an amount of from 5 to 15% by mass, more preferably from 5 to 10% by mass from the viewpoints of printed image density and viscosity of the ink composition.

<Organic Solvent>

The ink composition of the present invention is non-aqueous, that is, the dispersion medium of the pigments is composed of organic solvents. Examples of the organic solvents include non-polar solvents such as aliphatic hydrocarbon solvents, alicyclic hydrocarbon solvents, and aromatic hydrocarbon solvents; and polar solvents such as ester solvents, alcohol solvents, higher fatty acid solvents, and ether solvents. Examples of the aliphatic hydrocarbon solvents and alicyclic hydrocarbon solvents include Teclean N-16, Teclean N-20, Teclean N-22, Nisseki Naphtesol L, Nisseki Naphtesol M, Nisseki Naphtesol H, No. 0 Solvent L, No. 0 Solvent M, No. 0 Solvent H, Nisseki Isosol 300, Nisseki Isosol 400, AF-4, AF-5, AF-6 and AF-7, all manufactured by JX Nippon Oil & Gas Exploration Co., and Isopar G, Isopar H, Isopar L, Isopar M, Exxsol D40, Exxsol D80, Exxsol D100, Exxsol D130 and Exxsol D140, all manufactured by Exxon Mobil Corporation. Examples of the aromatic hydrocarbon solvents include Nisseki Cleansol G (alkylbenzene) manufactured by JX Nippon Oil & Gas Exploration Co., and Solvesso 200 manufactured by Exxon Mobil Corporation.

Examples of the ester solvents include methyl laurate, isopropyl laurate, hexyl laurate, isopropyl myristate, isopropyl palmitate, isooctyl palmitate, methyl oleate, ethyl oleate, isopropyl oleate, butyl oleate, methyl linoleate, isobutyl linoleate, ethyl linoleate, isopropyl isostearate, methyl soybean oil, isobutyl soybean oil, methyl tallate, isobutyl tallate, diisopropyl adipate, diisopropyl sebacate, diethyl sebacate, propylene glycol monocaprate, trimethylolpropane tri-2-ethylhexanoate and glyceryl tri-2-ethylhexanoate. Examples of the alcohol solvent include isomyristyl alcohol, isopalmityl alcohol, isostearyl alcohol and oleyl alcohol. Examples of the higher fatty acid solvents include isononanoic acid, isomyristic acid, hexadecanoic acid, isopalmitic acid, oleic acid and isostearic acid. Examples of the ether solvents include diethylene glycol monobutyl ether, ethylene glycol monobutyl ether, propylene glycol monobutyl ether and propylene glycol dibutyl ether. A mixture of two or more of these solvents can be used. Preferably, the ester solvents, particularly isooctyl parmitate, and hexyl laurate, are used.

<Optional Components>

The ink composition of the present invention can contain an optional component in such an amount that it does not impair the effects the present invention. For example, a resin may be added besides the above dispersants (A) and (B). Examples of the resin include acrylic resins, styrene-acrylic resins, styrene-maleic acid resins, rosin-based resins, rosin ester-based resins, ethylene-vinyl acetate resins, petroleum resins, cumarone-indene resins, terpene phenol resins, phenolic resins, urethane resins, melamine resins, urea resins, epoxy resins, cellulose-based resins, vinyl chloride acetate resins, xylene resins, alkyd resins, aliphatic hydrocarbon resins, butyral resins, maleic acid resins, fumaric acid resins, hydroxyl group-containing carboxylate esters, salts of long-chain polyaminoamides and high-molecular weight acid esters, salts of high-molecular weight polycarboxylic acids, salts of long-chain polyaminoamides and polar acid esters, high-molecular weight unsaturated acid esters, high-molecular weight copolymers, modified polyurethanes, modified polyacrylates, polyether ester anionic surfactants, naphthalenesulfonic acid-formalin condensate salts, aromatic sulfonic acid-formalin condensate salts, polyoxyethylene alkyl phosphate esters, polyoxyethylene nonylphenyl ethers, polyester polyamines, and stearyl amine acetate.

Preferably, the present ink composition contains a synergist. Synergists are derivatives of pigments having a polar group introduced to the pigment skeleton. Examples of the pigment skeleton include azo pigments, phthalocyanine pigments, quinacridone pigments, perylene pigments, isoindoline pigments, benzimidazolone pigments, pyranthrone pigments, thioindigo pigments, and quinophthalone pigments. Example of the polar group include alkylamino group, carboxyl group, sulfonic acid group, and phthalimide group. Among these, phthalocyanine pigments, particularly copper phthalocyanine blue synergists having a polar group such as sulfonic acid and amino group, for example, copper phthalocyanine blue sulfonate such as Solsperse 5000, Solsperse 12000, and Solsperse 22000, all available from Lubrizol Japan Ltd., are preferred. Other additives such as nozzle blockage prevention agents, antioxidants, conductivity modifiers, viscosity modifiers, surface tension modifiers and oxygen absorbers and the like may also be added.

The ink composition of the present invention can be prepared by placing a mixture of the dispersant (A), the dispersant (B) and the organic solvent, pigment, and additional organic solvent to adjust the viscosity of the ink composition, if needed, and an optional component as desired in a lump or in several parts in a disperser such as a bead mill, and stirring to mix them followed by filtering the mixture with a filter such as a membrane filter as desired.

The viscosity of the ink, though the suitable range thereof varies depending on several factors such as the diameter of ejecting head nozzles and ejecting environment, is preferably in the range of from 5 to 30 mPa·s, more preferably from 5 to 15 mPa·s, and most preferably about 10 mPa·s at 23° C. Here, the values of the viscosity are those measured at 23° C. by raising the shear stress from 0 Pa to 10 Pa at a rate of 0.1 Pa/s.

The ink composition of the present invention can be used with any type of inkjet recording apparatus as far as it is a piezoelectric type inkjet apparatus.

EXAMPLES

The present invention will be explained with reference to the examples described below, although the present invention is in no way limited by these examples.

<Preparation of Dispersant (B)>

(1) Urethane-Containing (Alkyl)Acrylate Copolymer

A 300 ml four-neck flask was charged with 75 g of AF-4 (a naphthene type solvent, ex Nippon Oil Corporation), and the temperature was raised to 110° C. under a stream of nitrogen gas while stirring. Subsequently, with the temperature maintained at 110° C., a mixture of 50 g of behenyl methacrylate, 35 g of 2-ethylhexyl methacrylate, 15 g of glycidyl methacrylate, 16.7 g of AF-4, and 2 g of Perbutyl O (t-butylperoxy-2-ethylhexanoate, ex NOF Corporation) was added dropwise to the flask over a period of 3 hours. Then, with the temperature maintained at 110° C., 0.2 g of Perbutyl O was added after an additional one hour and two hours respectively. The reaction mixture was aged for additional one hour, and then diluted with 10.6 g of AF-4, whereby a colorless and transparent solution of a backbone polymer with a non-volatile content of 50% was obtained. The polymer obtained had a weight average molecular weight (determined by GPC method using polystyrene standards) of from 20,000 to 23,000.

Subsequently, a 500 ml four-neck flask was charged with 81 g of isooctyl palmitate (IOP, ex Nikko Chemicals Co., Ltd.), 200 g of the above polymer solution obtained (with a solid content of 50% in AF-4), 4.0 g of propylene glycol, 2.8 g of diethanolamine, and the temperature was raised to 110° C. under a stream of nitrogen gas while stirring. After maintaining the temperature at 110° C. for one hour, 0.2 g of dibutyltin dilaurate was added, and a mixture of 10.2 g of Takenate 600 (1,3-bis(isocyanatemethyl)cyclohexane, ex Mitsui Polyurethane Co.) and 91.8 g of IOP was added dropwise to the flask over a period of one hour. Following the completion of the addition, the temperature was raised to 120° C. at which temperature the reaction was allowed to proceed for 6 hours. Subsequently, the reaction mixture was cooled, whereby a dispersion of dispersant resin with a solid content of 30%, herein after referred to as "dispersant 1", was obtained. The polymer obtained had a weight average molecular weight (determined by GPC method using polystyrene standards) of from 22,000 to 26,000 and a content of urethane moiety of 10% by mass.

(2) Morpholinyl Group-Containing (Alkyl)Acrylate Copolymer

A solution of a backbone polymer was prepared in the same manner as in (1) above. Subsequently, a 300 ml four-neck flask was charged with 68.0 g of IOP, 115.2 g of the backbone polymer solution (solid content of 50%), and 1.4 g of acryloyl morpholine, and the temperature was raised to 110° C. under a stream of nitrogen gas while stirring. Then, while maintaining the temperature at 110° C., a mixture of 2.6 g of methyl methacrylate, 2.6 g of butyl acrylate, 7.7 g of acrylic acid and 0.7 g of Perbutyl O was added dropwise to the flask over a period of 30 minutes. Subsequently, with the temperature maintained at 110° C., 0.2 g of Perbutyl O was added after stirring for an additional one hour and two hours respectively. After aged for an additional one hour at 110° C., the reaction mixture was diluted with 38.6 g of AF-4, whereby a dispersion of a dispersant resin with a solid content of 30%, hereinafter referred to as "dispersant 2" was obtained.

(3) Amino Group-Containing (Alkyl)Acrylate Copolymer

A 300 ml four-neck flask was charged with 7.2 g of lauryl methacrylate, 1.8 g of dimethylaminoethyl methacrylate, 1.8 g of glycidyl methacrylate, 5.4 g of 2-ethylhexyl methacrylate, and 0.9 g of styrene macromer (AS-6 having a number average molecular weight of 6,000, ex Toagosei Co., Ltd.) and mixed. To the mixture, a mixture of 1.0 g of polymerization initiator (V601, ex Wako Pure Chemical Industries, Ltd.), 120.0 g of AF-4, 132.0 g of IOP, and 12.0 g of isomyristyl alcohol (ex Nissan Chemical Industries, Ltd.) was added, and the mixture thus obtained was allowed to react under reflux at 80° C. for 6 hours, whereby a dispersion of a dispersant resin with a solid content of 6.1%, hereinafter referred to as "dispersant 3" was obtained.

Examples 1-5, Comparative Examples 1-5

Each non-aqueous ink composition was prepared by placing in a glass container the components according to the formulation (% by mass) shown in Tables 2 and 3, and 80 g of zirconia beads (diameter: 0.5 mm), and then shaking the container using a rocking mill (Model RMO5S, ex Seiwa Technical Lab Co., Ltd.) at 60 Hz for 2 hours.

Details of the components indicated in Tables 2 and 2 are as follows:

Carbon black: MA-100 having a DBP absorption number of 100 $cm^3/100$ g and a specific surface area by nitrogen adsorption of 110 $m^2/g$, ex Mitsubishi Chemical Co.

(A) polyvinylpyrrolidone: Antaron V-216, VP/hexadecene copolymer, ex ISP Co.

(A) polyamide: Solsperse 11200, ex Lubrizol Japan Ltd.

Comparative dispersant: Disperbyk-101, a long-chain polyamideamide salt of an acid ester, ex BYK-Chemie GmbH.

Synergist: Solsperse 5000, ex Lubrizol Japan Ltd.

Ink compositions prepared were evaluated according to the following methods.

Results are shown in Tables 2 and 3.

<Storage Stability of Ink Composition>

At a temperature of 23° C., an initial viscosity of each ink composition was measured using a rheometer RS300, ex Haake GmbH, at 10 Pa by raising a shear stress from 0 Pa at a rate of 0.1 Pa/s to 10 Pa. Then, 30 g of the ink composition were please in a sealed 50 ml-glass container and left to stand for 3 months at 70° C., and then the viscosity of the composition was measured in the similar manner as above. The absolute value of a viscosity change percentage was calculated according to the following equation, which was then rated according to the following criteria.

|Viscosity change percentage|=|100×(viscosity after 3 months−initial viscosity)/initial viscosity|

TABLE 1

| Grade | \|Viscosity change\|, % |
|---|---|
| A | less than 5% |
| B | 5% or greater and less than 10% |
| C | 10% or greater |

<Satellites>

In an environment of a temperature of 15° C., printing was performed on A4 size paper using ORPHIS-X, ex Riso Kagaku Co., under the printing conditions of a head gap of 3 mm, a printing speed of 120 ppm, a resolution of 300 dpi×300 dpi, and 6 drops/dot. The printed image was evaluated according to the following criteria.

A: Satellites were hardly found with good image quality.
B: A few satellites were found, but with tolerable image quality for practical use.
C: Too many satellites were found for practical use.

TABLE 2

| | | Example 1 | Example 2 | Example 3 | Example 4 | Example 5 |
|---|---|---|---|---|---|---|
| Pigment | Carbon black | 8.0 | 8.0 | 4.0 | 8.0 | 8.0 |
| Pigment dispersant | (A)Polyvinylpyrrolidone | | 1.0 | | | |
| | (A)Polyamide (solid content 50%) | 1.0 | | 0.3 | 1.0 | 1.0 |
| | (B)Dispersant 1 (solid content 30%) | 20.0 | 20.0 | 2.5 | | |
| | (B)Dispersant 2 (solid content 30%) | | | | 20.0 | |
| | (B)Dispersant 3 (solid content 6.1%) | | | | | 90.7 |
| | Comparative pigment dispersant | | | | | |
| Organic solvent | AF-4 | 40.0 | 40.0 | 55.5 | 40.0 | |
| | Isooctyl palmitate | 25.7 | 25.7 | 32.4 | 25.7 | |
| | Isomyristyl alcohol | 5.0 | 5.0 | 5.0 | 5.0 | |
| Synergist | | 0.3 | 0.3 | 0.3 | 0.3 | 0.3 |
| | Total | 100.0 | 100.0 | 100.0 | 100.0 | 100.0 |
| | Solid content of dipersant (B) in ink | 6.0 | 6.0 | 0.8 | 6.0 | 5.5 |
| | Solid content of dipersant (A) in ink | 0.5 | 1.0 | 0.2 | 0.5 | 0.5 |
| | (B)/[(A) + (B)] | 0.92 | 0.86 | 0.83 | 0.92 | 0.92 |
| | [(A) + (B)]/pigment | 0.81 | 0.88 | 0.23 | 0.81 | 0.75 |
| | Storage stability | A | A | B | A | A |
| | Satellite | A | A | A | A | A |

TABLE 3

|  |  | Comparative Example 1 | Comparative Example 1 | Comparative Example 1 | Comparative Example 1 | Comparative Example 1 |
|---|---|---|---|---|---|---|
| Pigment | Carbon black | 8.0 | 8.0 | 8.0 | 5.0 | 8.0 |
| Pigment dispersant | (A)Polyvinylpyrrolidone |  |  |  |  |  |
|  | (A)Polyamide (solid content 50%) | 5.0 |  | 5.0 | 0.2 |  |
|  | (B)Dispersant 1 (solid content 30%) |  | 20.0 | 20.0 | 2.5 | 20.0 |
|  | (B)Dispersant 2 (solid content 30%) |  |  |  |  |  |
|  | (B)Dispersant 3 (solid content 6.1%) |  |  |  |  |  |
|  | Comparative pigment dispersant |  |  |  |  | 2.0 |
| Organic solvent | AF-4 | 40.0 | 40.0 | 40.0 | 55.5 | 40.0 |
|  | Isooctyl palmitate | 41.7 | 26.7 | 21.7 | 31.5 | 24.7 |
|  | Isomyristyl alcohol | 5.0 | 5.0 | 5.0 | 5.0 | 5.0 |
| Synergist |  | 0.3 | 0.3 | 0.3 | 0.3 | 0.3 |
|  | Total | 100.0 | 100.0 | 100.0 | 100.0 | 100.0 |
|  | Solid content of dipersant (B) in ink | 0.0 | 6.0 | 6.0 | 0.8 | 6.0 |
|  | Solid content of dipersant (A) in ink | 2.5 | 0.0 | 2.5 | 0.1 | 1.0 |
|  | (B)/[(A) + (B)] | 0.00 | 1.00 | 0.71 | 0.88 | 0.85 |
|  | [(A) + (B)]/pigment | 0.31 | 0.75 | 1.06 | 0.17 | 0.88 |
|  | Storage stability | A | C | A | C | C |
|  | Satellite | C | A | C | B | B |

As shown in Table 2, the present ink compositions of Examples 1-5 showed no satellites even in the low-temperature atmosphere, and with a wider head gap than normal. In addition, they all had good storage stability. On the other hand, as shown in Table 3, the ink composition of Comparative Example 1 lacking dispersant (B), and that of Comparative Example 3 containing insufficient amount of dispersant (B) showed many satellites. The ink composition of Comparative Example 4 containing insufficient amount of dispersants, and that of Comparative Example 5 containing a dispersant having a structure different from those specified in the present invention showed poor results in terms of both storage stability and satellite. The ink composition of Comparative Example 2 lacking dispersant (A) showed no satellites but had poor storage stability, resulting in thickening of the ink composition.

INDUSTRIAL APPLICABILITY

The non-aqueous ink composition of the present invention hardly shows satellites and is suitable for high-speed inkjet printing.

It should be noted that, besides those already mentioned above, various modifications and variations can be made in the aforementioned embodiments without departing from the novel and advantageous features of the present invention. Accordingly, it is intended that all such modifications and variations are included within the scope of the appended claims.

The invention claimed is:

1. A non-aqueous ink composition for inkjet printing, comprising 5 to 15% by mass of pigment relative to a mass of the non-aqueous ink composition, a pigment dispersant in such an amount that a mass ratio of the pigment dispersant to the pigment ranges from 0.2 to 2.0, and an organic solvent, the pigment dispersant comprising (A) a polyamide having a polyester side chain and/or a copolymer of vinylpyrrolidone and a $C_{10-40}$ alkene, and (B) an alkyl(alkyl)acrylate copolymer having a $C_{12-25}$ alkyl group and a nitrogen-containing group in such an amount that a mass ratio of the dispersant (B) to a total of the dispersant (A) and the dispersant (B), (B)/[(A)+(B)], ranges from 0.75 to 0.99.

2. The non-aqueous ink composition according to claim 1, wherein the dispersant (A) comprises a polyamide having a polyethyleneimine main chain and a side chain that is bonded to a nitrogen atom of the main chain and has 3 to 80 repeating units of the following formula (1):

wherein $R^1$ is a $C_{3-6}$ alkylene group.

3. The non-aqueous ink composition according to claim 1, wherein the dispersant (A) is a vinylpyrrolidone/hexadecene copolymer having a weight average molecular weight of from 3,000 to 50,000.

4. The non-aqueous ink composition according to claim 1, wherein the dispersant (B) is an alkyl(alkyl)acrylate copolymer having a backbone comprising repeating units of the formula (2), and an urethane side chain or crosslinking comprising repeating units of the formula (3):

wherein $R^2$ is a hydrogen atom or a $C_{1-3}$ alkyl group, $R^3$ is a $C_{12-25}$ alkyl group, $R^4$ is a $C_{6-16}$ divalent hydrocarbon group, and $R^5$ is a $C_{2-20}$ alkylene group or oxyalkylene group.

5. The non-aqueous ink composition according to claim 1, wherein the non-aqueous ink composition further comprises a synergist.

* * * * *